April 18, 1933. P. GANGLER 1,904,131
COMBINED MACHINE FOR MAKING, FILLING, AND CLOSING BAGS
Filed Dec. 16, 1930 13 Sheets-Sheet 1
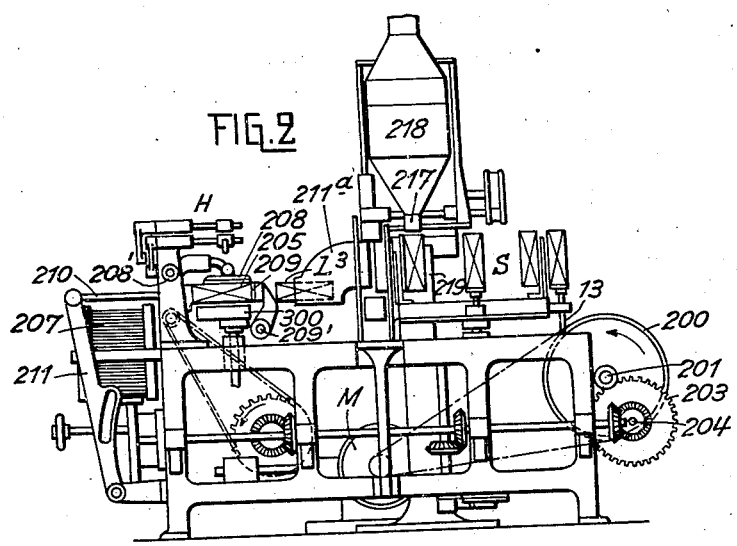
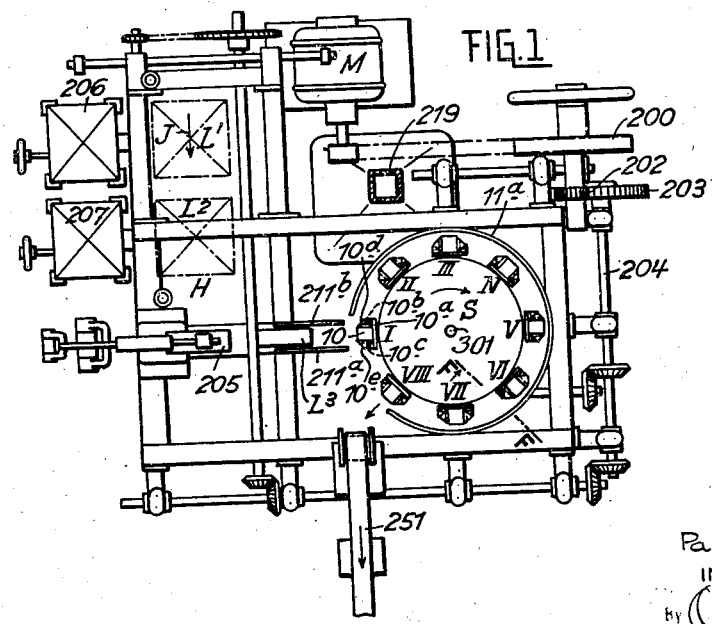
Paul Gangler
INVENTOR;
his Attorney.

April 18, 1933. P. GANGLER 1,904,131
COMBINED MACHINE FOR MAKING, FILLING, AND CLOSING BAGS
Filed Dec. 16, 1930 13 Sheets-Sheet 2
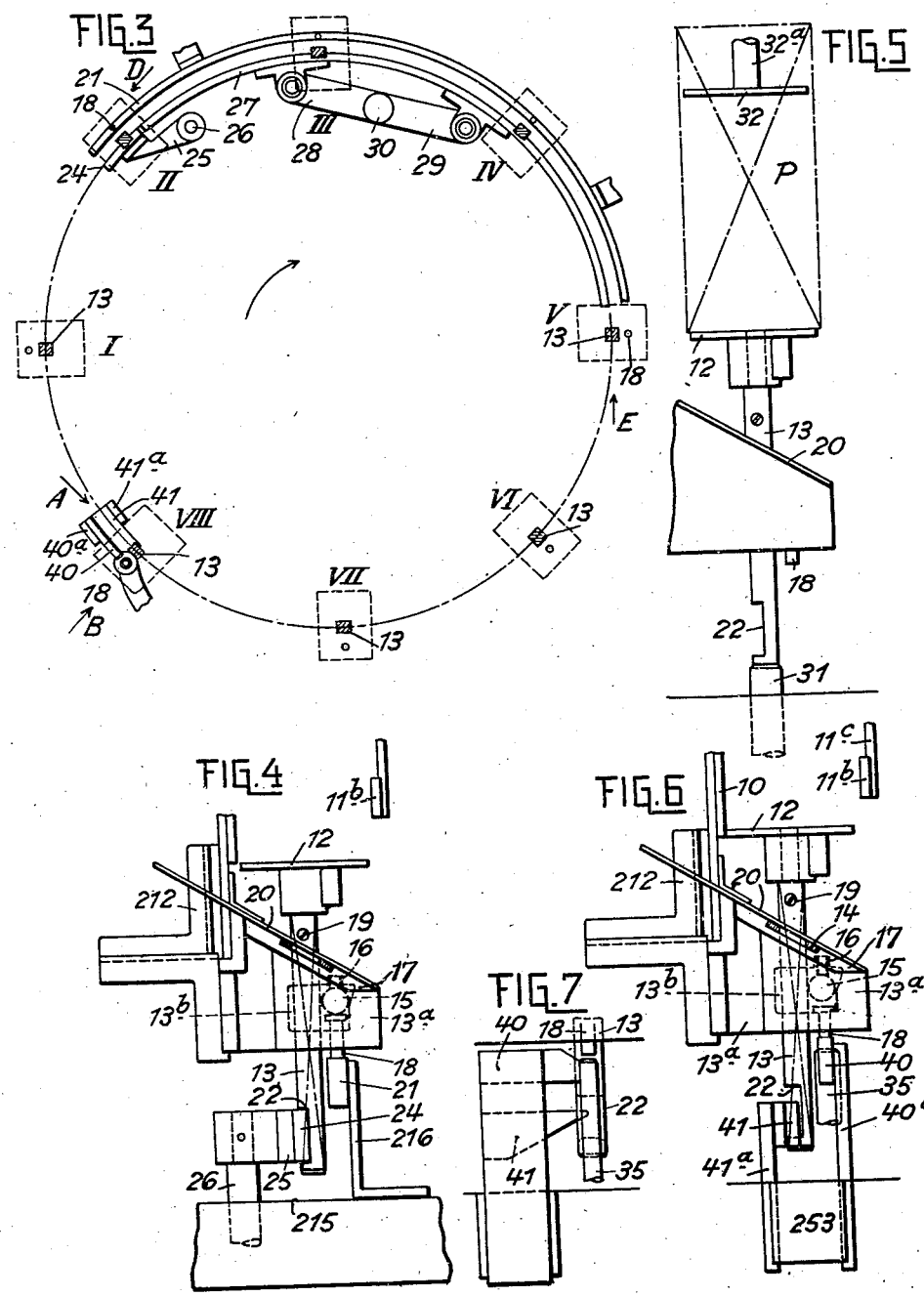
Paul Gangler
INVENTOR;
By
his Attorney.

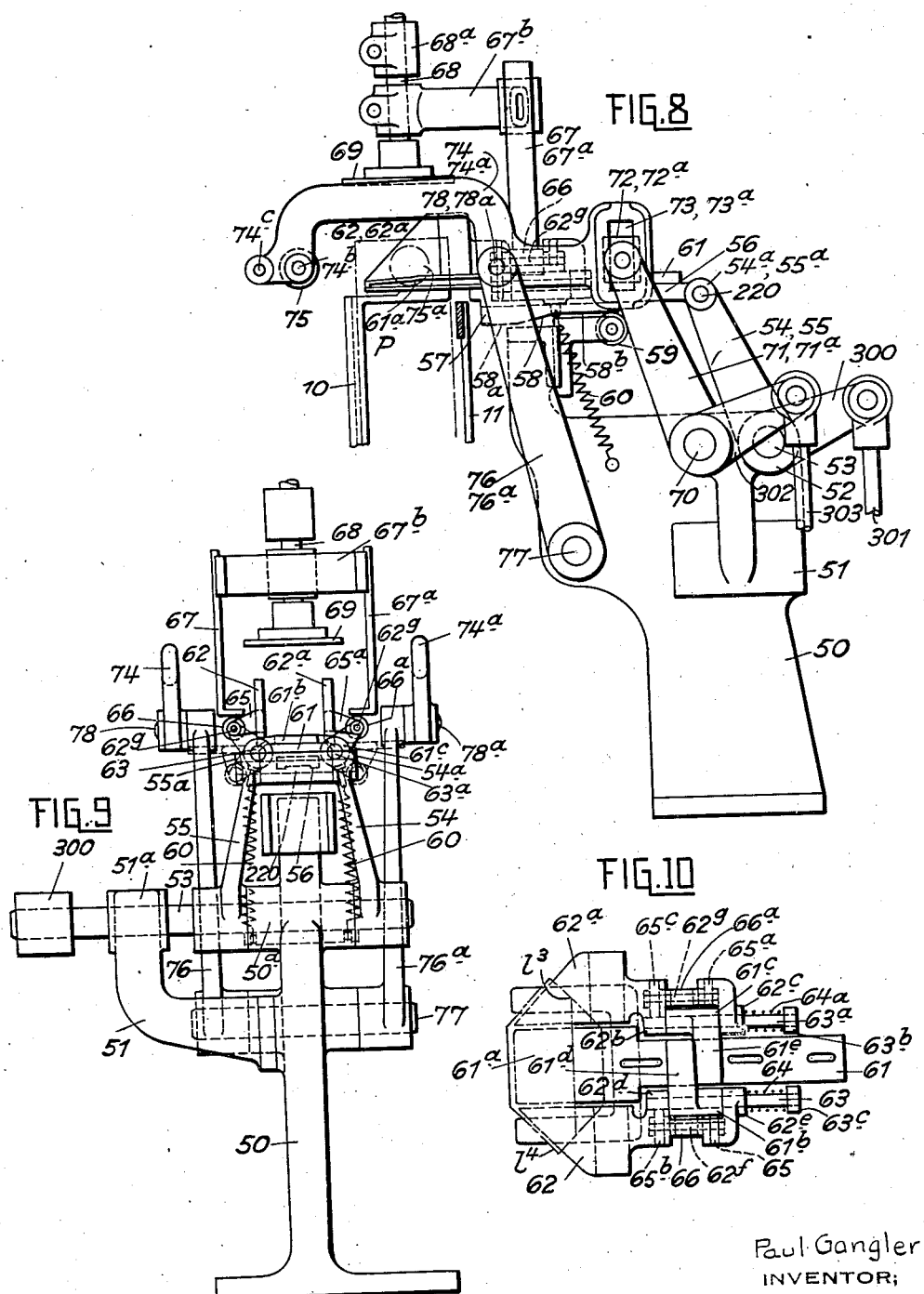

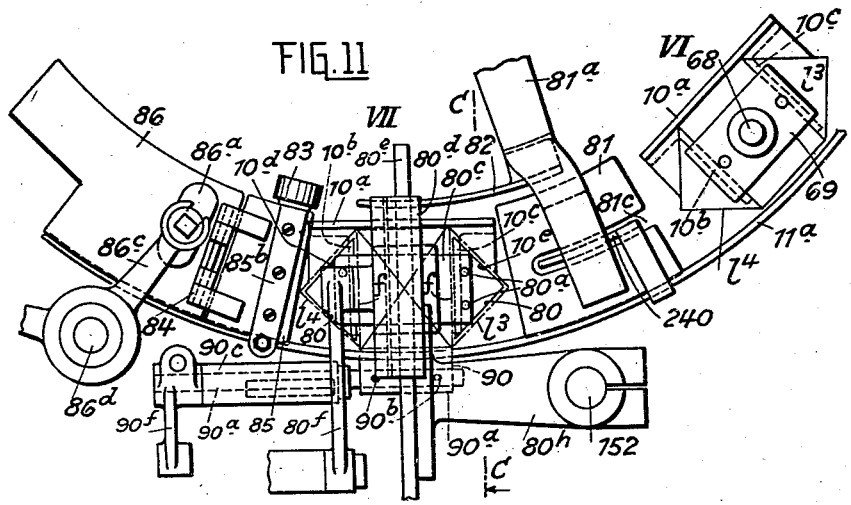

April 18, 1933.  P. GANGLER  1,904,131
COMBINED MACHINE FOR MAKING, FILLING, AND CLOSING BAGS
Filed Dec. 16, 1930   13 Sheets-Sheet 5
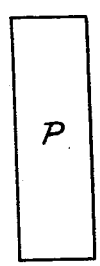
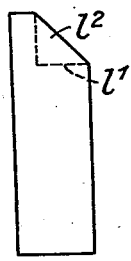
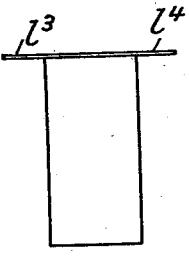
FIG.16   FIG.17   FIG.18
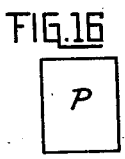
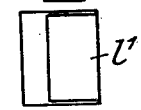
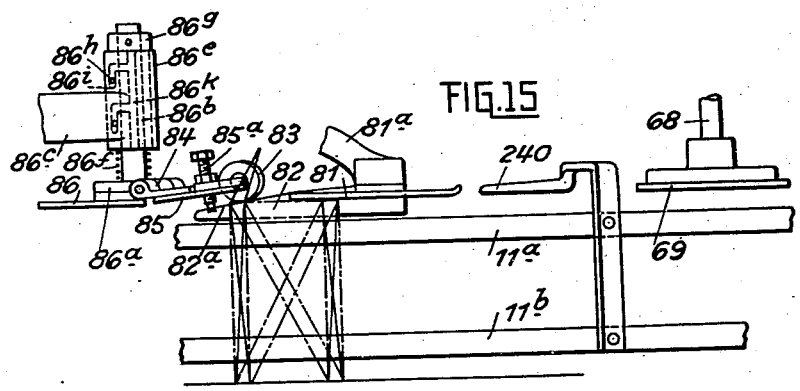
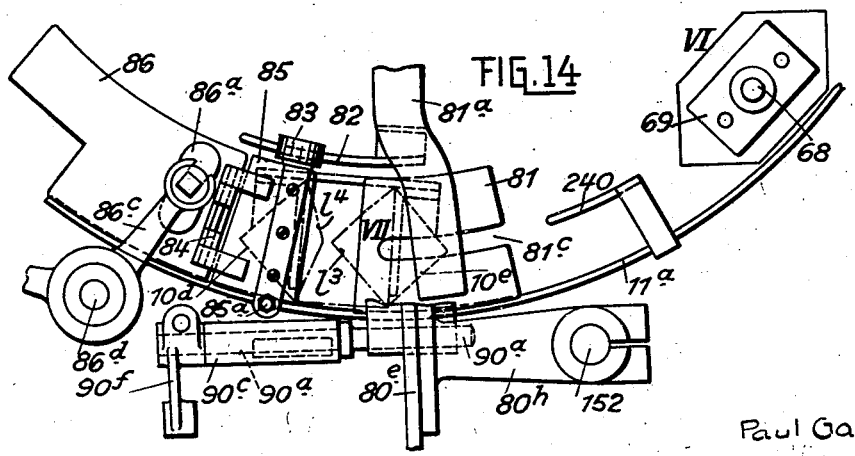
Paul Gangler
INVENTOR;
By
his Attorney.

April 18, 1933.  P. GANGLER  1,904,131
COMBINED MACHINE FOR MAKING, FILLING, AND CLOSING BAGS
Filed Dec. 16, 1930    13 Sheets-Sheet 6
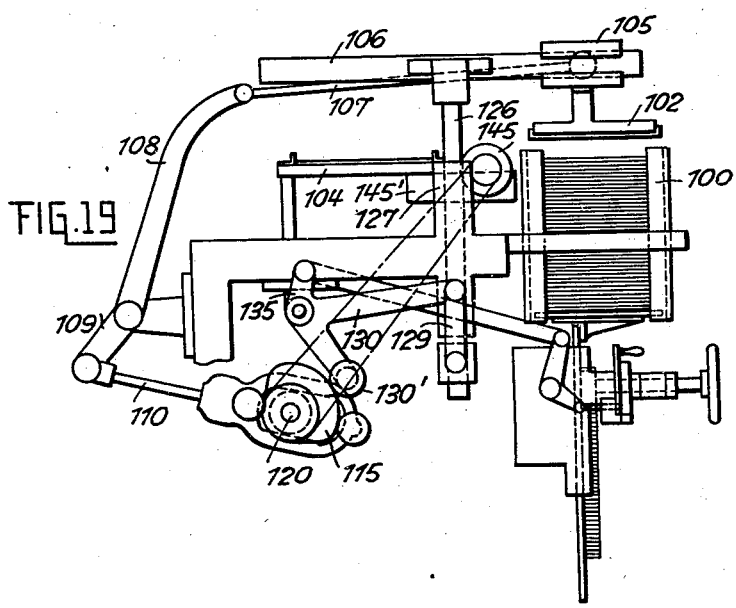
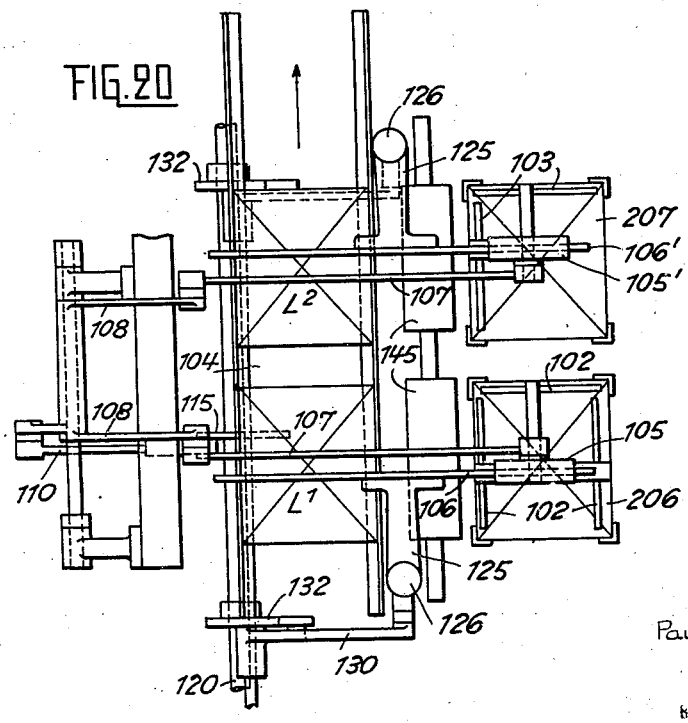
Paul Gangler
INVENTOR

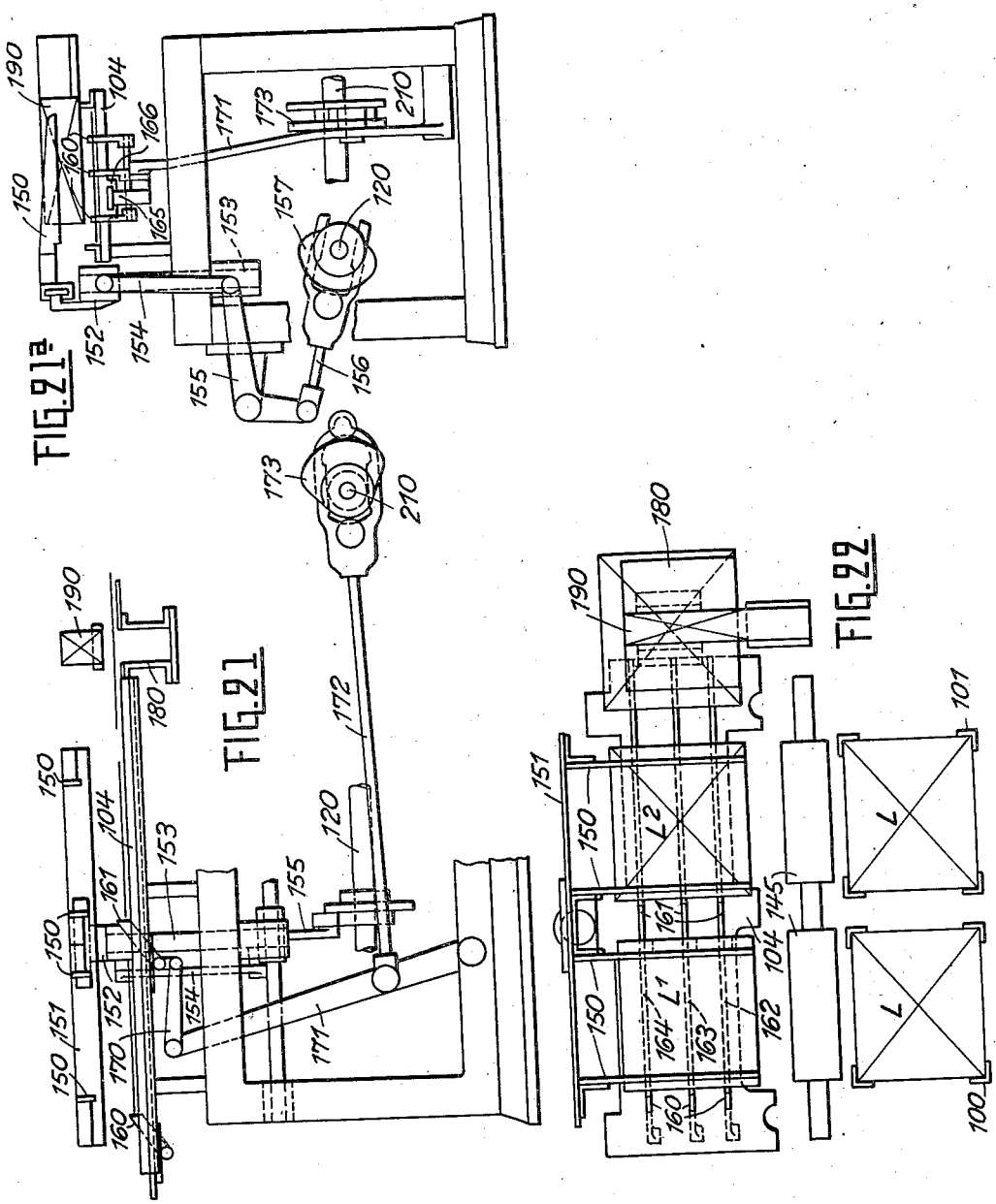

April 18, 1933.　　　　P. GANGLER　　　　1,904,131
COMBINED MACHINE FOR MAKING, FILLING, AND CLOSING BAGS
Filed Dec. 16, 1930　　　13 Sheets-Sheet 8
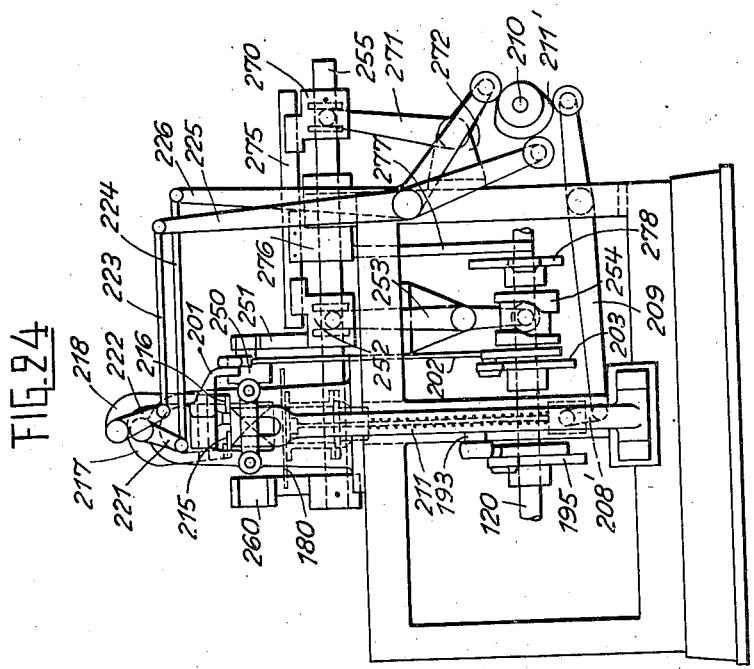
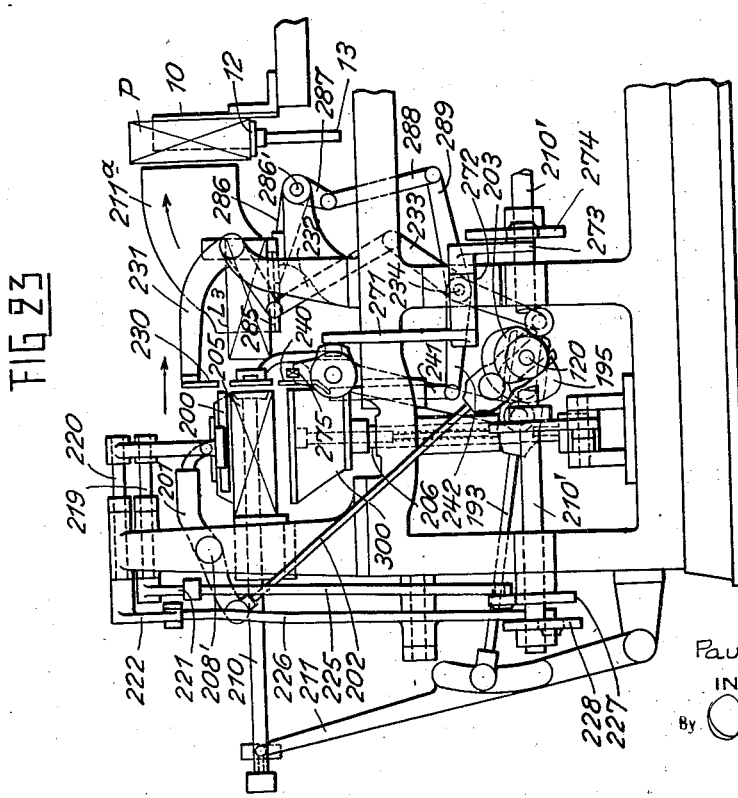
Paul Gangler
INVENTOR;
By
his Attorney.

April 18, 1933.   P. GANGLER   1,904,131
COMBINED MACHINE FOR MAKING, FILLING, AND CLOSING BAGS
Filed Dec. 16, 1930    13 Sheets-Sheet 9

Paul Gangler
INVENTOR;
By
his Attorney.

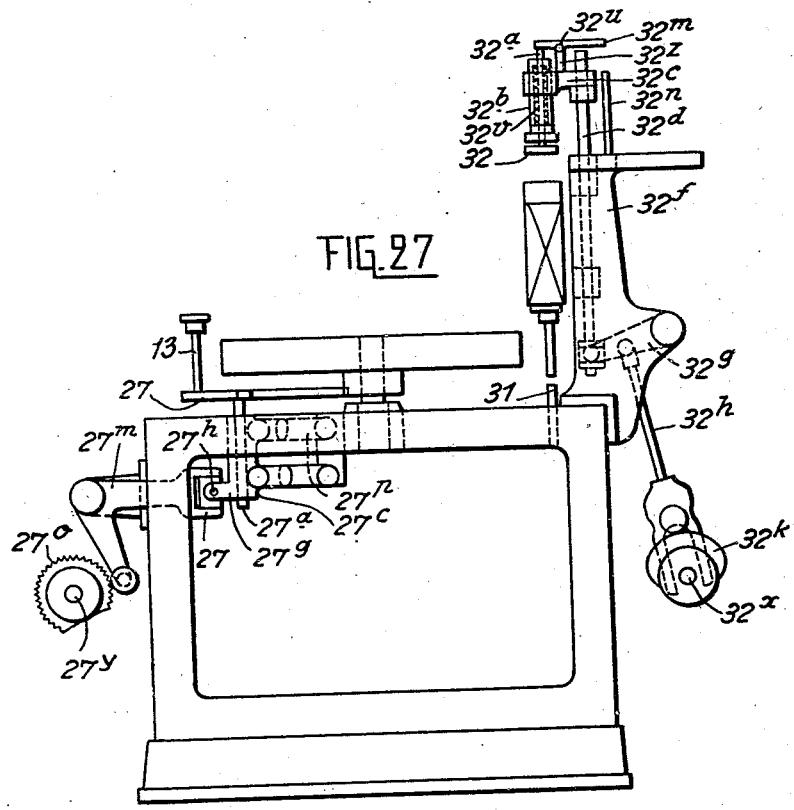
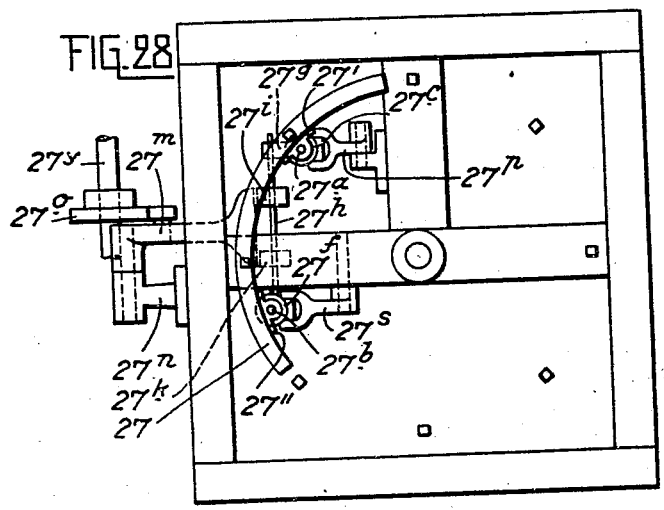

April 18, 1933.  P. GANGLER  1,904,131
COMBINED MACHINE FOR MAKING, FILLING, AND CLOSING BAGS
Filed Dec. 16, 1930  13 Sheets-Sheet 11

Paul Gangler
INVENTOR:

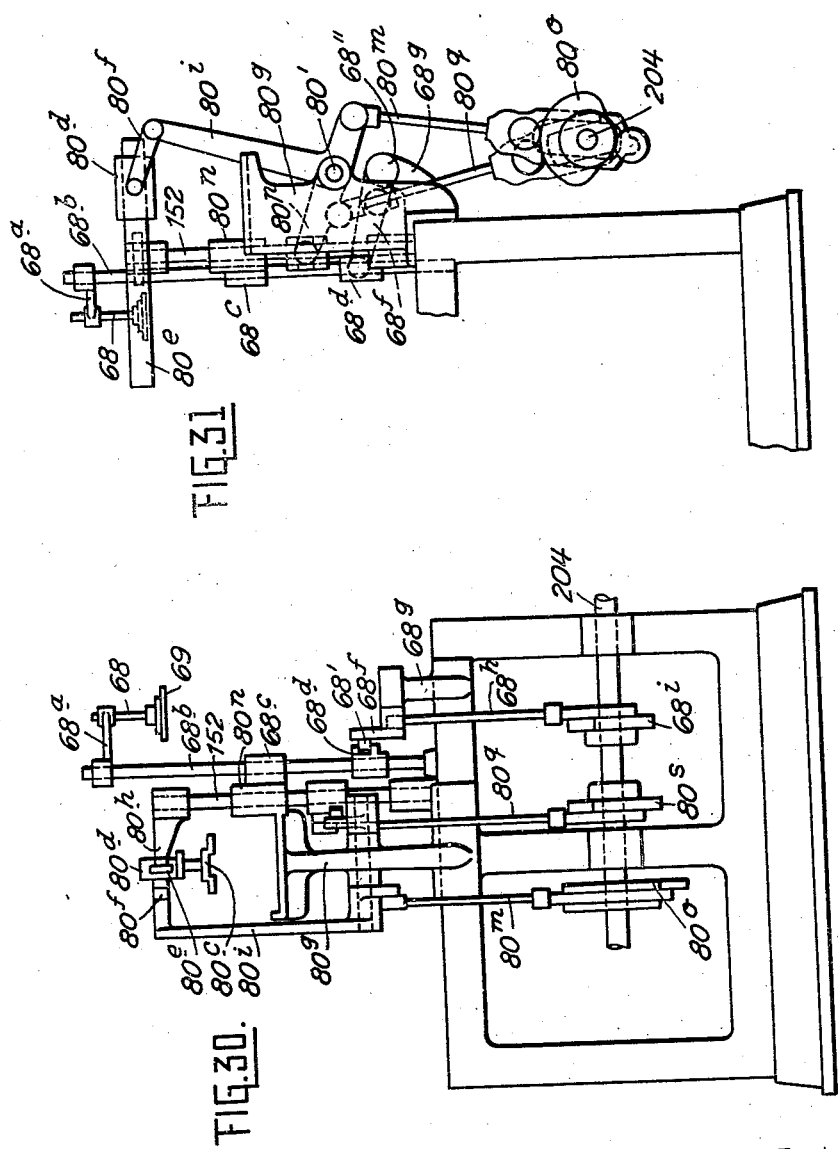

April 18, 1933.   P. GANGLER   1,904,131
COMBINED MACHINE FOR MAKING, FILLING, AND CLOSING BAGS
Filed Dec. 16, 1930   13 Sheets-Sheet 13

Paul Gangler
INVENTOR;
By [signature]
his Attorney.

Patented Apr. 18, 1933

1,904,131

UNITED STATES PATENT OFFICE

PAUL GANGLER, OF ESSLINGEN, GERMANY, ASSIGNOR TO FIRM FR. HESSER, MASCHIN-ENFABRIK-AKTIENGESELLSCHAFT, OF STUTTGART-CANNSTATT, GERMANY

COMBINED MACHINE FOR MAKING, FILLING, AND CLOSING BAGS

Application filed December 16, 1930, Serial No. 502,672, and in Germany December 17, 1929.

My invention relates to such packing machines in which not only finished bags of paper or similar material are filled and closed, but in which also the bags to be filled and closed are manufactured. The hitherto known, so-called combined packing plants of this kind cannot be employed in small and medium works, because for obtaining a high output they are on the one hand too expensive while on the other hand the high output cannot be economically utilized to the full extent in small or medium works, so that such packing plants must be shut down temporarily and then occupy a comparatively large floor space uselessly.

The object of the invention is to provide such a combined packing machine which is of simpler construction and lower capacity, so that the first costs are considerably reduced, the plant occupies as small a space as possible, and can be utilized to the full also for medium outputs. For this purpose, the invention consists substantially in providing in the present machine for making, filling and closing bags in combination with a conveying device having a plurality of receptacles or containers by which the bags are intermittently conveyed to the various working stations for filling, jolting or shaking, closing and other treatment of the bags, a single folding mandrel upon which the bags are made from one or more sheets of paper fed on to the mandrel sideways and then conveyed into the individual receptacles of the said conveying device advancing in step with the manufacture of the bags.

A machine according to this invention is by way of example illustrated in the accompanying drawings. In the drawings is:

Fig. 1, a diagrammatic plan of the complete machine or plant,

Fig. 2, an elevation of the machine shown in Fig. 1,

Fig. 3, a diagrammatic plan of the feeding device of the filling and closing device, Fig. 4, an elevation of the mechanism of the working station II of Fig. 3, viewed in the direction of the arrow D, Fig. 5, an elevation of the mechanism of working station V of Fig. 3, viewed in the direction of the arrow E, Fig. 6, an elevation of the apparatus at working station VIII of Fig. 3, viewed in the direction of the arrow A, Fig. 7, a side elevation of the mechanism of Fig. 6, viewed in the direction of the arrow B in Fig. 3, Fig. 8, on a larger scale, an elevation of the mechanism at the working station VI, viewed from line F—F in Fig. 1, Fig. 9, a front elevation viewed from the right hand side on Fig. 8, Fig. 10, a part of the Fig. 8 in plan, Fig. 11, a plan of the working stations VI and VII of Fig. 1 on a large scale, Fig. 12, an external view of the parts of Fig. 8, Fig. 13, an elevation of the mechanism of working station VII viewed from line C—C of Fig. 11, Figs. 14 and 15, a plan and a side elevation of the parts of Figs. 11 and 12 in different positions, and Figs. 16, 17, and 18, diagrams explanatory of the folding operation during the closing of the bags.

Figures 19 and 20 show in side elevation and in plan the mechanism for lifting the sheets for the bag manufacture off the piles.

Figures 21, 21ᵃ and 22 show in side elevation, front view, and in plan the conveyor mechanism of the bag making machine.

Figures 23 and 24 illustrate in side elevation and front view the folding mechanism cooperating with the folding mandrel of the bag making machine.

Figures 27 and 28 show in side elevation and in plan the mechanism for jolting the filled bags and for adjusting the level of the crease edge of the bag for closing the same.

Figure 29:
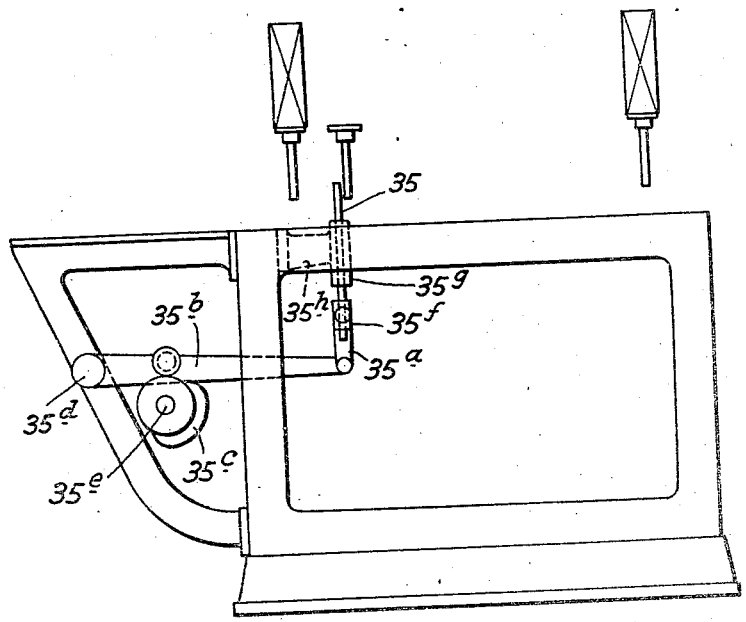
Figure 29A:
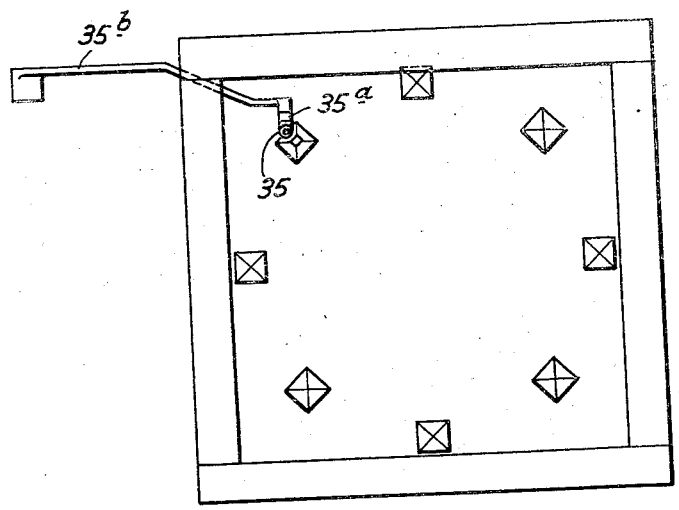

Figures 29 and 29ᵃ show in side elevation and in plan details of the mechanism adapted to raise the bottom plates of the conveyor receptacles.

Figure 32:
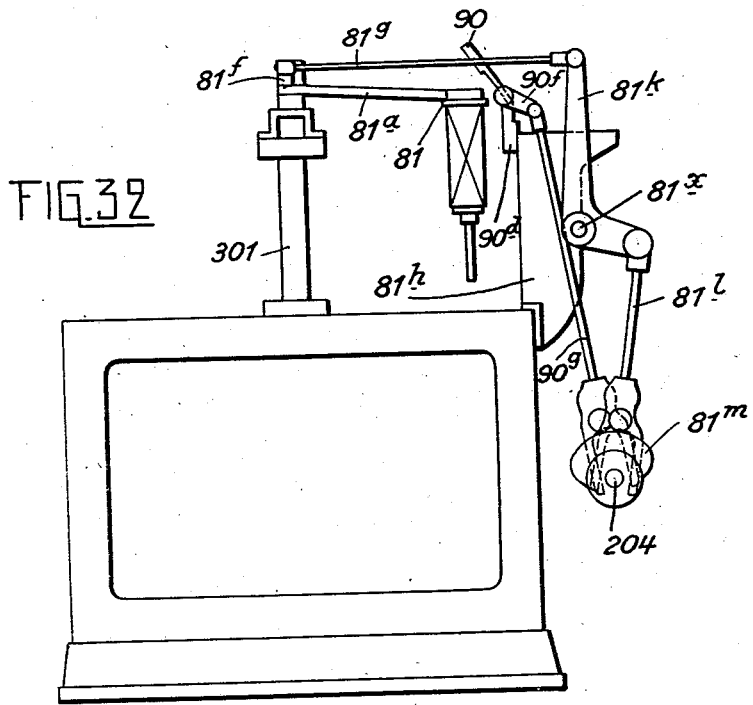
Figure 33:
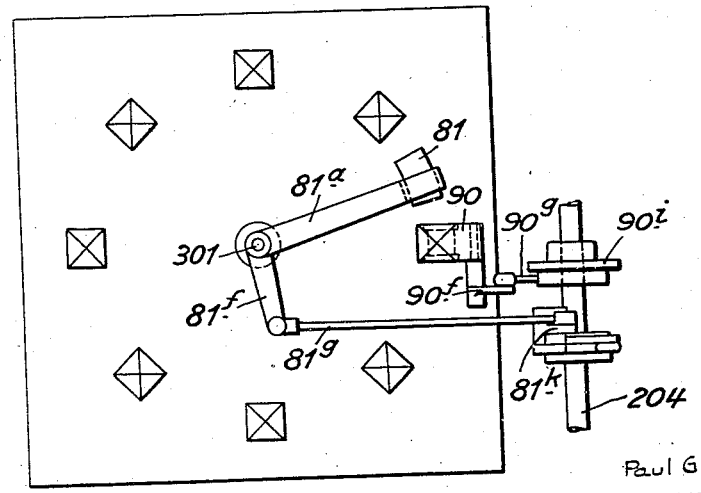

Figures 30 and 31 show in front view and side elevation driving mechanism for the folding appliances, and Figures 32 and 33 show in side elevation and in plan other driving mechanism for folding means of the bag closing appliance.

As indicated in diagram in Figure 1, the improved machine consists substantially of the part H for the manufacture of the bags in combination with the part S for filling and closing these bags. The drive takes place from a suitable source of power, for instance from an electric motor M, through the agency of a driving disc 200 adapted to be thrown into and out of gear by means of a suitable clutch on to the shaft 201, which transmits its rotation on to the shaft 204 by means of the gear wheels 202 and 203. From this shaft are operated the other driving shafts of the machine by means of pairs of bevel wheels, in the well-known manner.

The part H of the machine which serves for the manufacture of the bags to be filled and closed, is merely equipped with a single folding or wrapping mandrel which is indicated at 205 and upon which the bag is manufactured. Bags consisting of a single or a double envelope may be produced. In the present case, the part H is in Figures 1 and 2 shown diagrammatically as adapted for the manufacture of bags consisting of a double envelope of paper or a similar material.

The sheets for the outer envelopes are piled up in the pile 206 and those for the inner envelopes in the pile 207. From these piles the topmost sheets are lifted off in such a way that the two sheets will be laid one over the other and at the proper places provided with an adhesive and are conveyed to the said folding mandrel 205. The withdrawal of the sheets from the piles 206 and 207 may take place, for instance, in the usual manner by the known glue stamps having at their underface projecting ledges provided with an adhesive.

Referring to Figures 19 and 20, 102 and 103 designate ledges forming the glue stamps for lifting the sheets off the piles 206 and 207. These stamps are secured to slides 105 and 105' which are guided on the rails 106 and 106'. Oscillation is imparted to the slide 105 by means of the connecting link 107, the levers 108 and 109 and rod 110 by the eccentric 115 secured to the rotating shaft 120, which is driven from the main shaft by means of suitable bevel gears, as shown in Figure 1. An up and down motion is imparted to the rail 106 by means of the rod 126 guided in the slide 127, a connecting link 129, and a double-armed lever 130, held by a spring, not shown, in the well known manner with an anti-friction roller 130' against the eccentric 132. Glue is applied to the ledges 102 by means of a roller 145 rotated by suitable known means within a container 145' filled with glue. The operating mechanism for the slide 105' is constructed in the same manner as described for the slide 105. By lowering the glue applying stamps in their illustrated position upon the piles 206 and 207, the uppermost sheets of these piles are provided with adhesive by the ledges 102 and 103 and are lifted off the piles by raising the stamps 102 and 103. In their raised position, the stamps 102 and 103 are moved to the left, in Figures 19 and 20, at such a level that they do not touch the adhesive applying roller 145. Above the table 104 the stamps 102 and 103 are lowered upon this table, and rails 150, Figures 21, 21$^a$ and 22 are moved from an upper inoperative position down into their operative position shown in Figure 22 above the sheets situated at L$^1$ and L$^2$. The rails 150 are secured to a rail 151 mounted on a bracket 152 which is vertically guided on a bolt 153. A vertical reciprocation may be imparted to the bracket 152 by means of the connecting link 154, the double-armed lever 155 and the rod 156 by the eccentric 157 secured to the rotating driving shaft 120, which is also driven by bevel gears from the main shaft. As soon as the sheets have been lowered by the glue applying stamps 102 and 103 upon the table 104, the rails 150 are also lowered upon the said sheets and hold them down, while the stamps 102 and 103 are again raised.

The conveyor mechanism for the sheets deposited at L$^1$ and L$^2$ consist of pushers 160 and 161, which are guided in guide slots 162, 163, and 164. The pushers are secured beneath the table 104 to a slide 165 which is displaceable on a guide 166 secured to the table 104. A reciprocating motion is imparted to the slide 165 by means of the connecting link 170, lever 171, rod 172 and eccentric 173 secured to the rotating driving shaft 210. By the reciprocating motion of the pushers 160 and 161, the sheet deposited at L$^1$ is conveyed to L$^2$ and the two superposed sheets situated at L$^2$ are conveyed upon the well known folding box 300, Figure 1, under the folding mandrel 205. Here the superposed outer and the inner sheets forming the bag are by a lifting motion of the folding box 300, which has the known U-shaped cross section corresponding to the cross section of the mandrel, and by an inward motion of the well known lateral folding slides 215 and 216 wrapped from the bottom upwards around the folding mandrel in the shape of a hose or tube and cemented together along the longitudinal seam of the hose at the top side of the folding mandrel. Upon this longitudinal seam then descends the stamp 208 for pressing the said seam. The stamp 208 for pressing the longitudinal seam of the bag formed on the folding mandrel is pivoted to a lever 201, Figures 23 and 24, which is operated by a rod 202 and an eccentric 203 secured to the shaft 120. The folding box 300 is secured to a hollow rod 206 guided for vertical reciprocation in the machine frame. The reciprocation is imparted to the rod 206 by a connecting link 208' which is pivotally connected to a block mounted on the under end of this rod and a double-armed lever 209 by an eccentric 211' secured to the driving shaft 210'. The sheets are by the upward movement of the folding box 300 folded against the bottom and the sides of the mandrel 205, as above described.

The upper side folders 215 and 216 are secured to levers 217 and 218 which may be swung inwardly and outwardly by the levers 221 and 222 in order to fold down upon the top side of the folding mandrel the upstanding side flaps of the sheets, so as to form a hose encircling the mandrel. Motion is imparted to the levers 217 and 218 by means of the rods 223 and 224, double-armed levers 225 and 226 and eccentrics 227 and 228 secured to the driving shaft 210.

The first bottom folder 230 is secured to a double-armed lever 231 operated by connecting link 232, the double-armed lever 233 pivoted at 234, and an eccentric (not shown) on the shaft 120. The second bottom folder 240 is secured to a slide 241 which is guided for up and down motion on a suitable guide of the machine frame. The slide 241 is operated by a double-armed lever 242 pivoted at 234, and an eccentric (not shown) on the driving shaft 120.

The lateral bottom folder 250 is secured to an arm 251 which is guided by an eye 252 for horizontal reciprocation on the shaft 255. The eye 252 is operated by a lever 253, and a drumlike eccentric 254 on the shaft 120. The last bottom folder 260 is secured to the shaft 255 which is mounted for horizontal reciprocation in suitable bearings of the machine frame. Horizontal reciprocation is imparted to the shaft 255 and, thereby, to the folder 260 by means of a lever 271. This lever is by means of a bolt pivoted in a bearing 272 of the machine frame and is rigidly connected by this bolt with a lever 273 operated by the eccentric 274 mounted on the shaft 210. The two eyes 252 and 270 are guided by a rail 275 which is secured to the eye 276 of the lever 277 which is pivoted by said eye 276 on the rod 255 and is operated by the eccentric 278 of the shaft 120, in such a way that a rocking motion is imparted to the guide rail 275 in respect to the front face of the folding mandrel 205. At first, the two folders 230 and 240 fold down upon the front face of the mandrel 205 the corresponding flaps. After they have been retracted, the folder 250 is first displaced in front of the mandrel so that it will fold inwardly the adjacent upstanding flap, and then the folder 250 is moved by means of the rail 275 against front face of the mandrel in order to press this flap. Now the last flap is folded down by moving the folder 260 to the right hand by means of the rod 255 and the lever 271. After the last flap has been folded down by the folder 260, the folder 250 is retracted and the folded parts are again pressed by the folder 260.

After the bag has been completed, the bag is ejected by means of the rod 210 into the position L³ upon a swinging supporting plate 286 and between the lateral guide walls 211ª. The rod 210 may be advanced in the longitudinal direction of the mandrel and withdrawn again by means of a link 210 and a lever 211. The lever 211 is operated by the rod 193 and the eccentric 195 secured to the rotating driving shaft 120'. The plate 286 is pivotally mounted by bolt 286' and is rigidly connected by said bolt to a lever 287 which is operated by means of the link 288 and the double-armed lever 289 by an eccentric (not shown) mounted on the shaft 120 so as to swing the plate 286 from the horizontal position, shown in Figure 23, into a vertical position and to bring the empty bag from the position L³ into the upright position indicated at P in Figure 23 between the lateral guide walls 211ª, 211ᵇ into that receptacle of the conveyor mechanism of the filling and closing or sealing device S which is situated at the working station I of the said sealing mechanism. This conveyor consists in the case illustrated of a wheel 212 formed by two angles, see Figure 4, placed and bolted together, which wheel is rotated in step with the intermittent feed motion of the above named conveyor of the part H, so that the receptacles of the conveyor wheel 212 reach in succession the working stations I, II, III ... VIII over which are distributed the appliances or mechanisms for filling, shaking, sealing, labeling or otherwise treating the bags.

Figure 25:
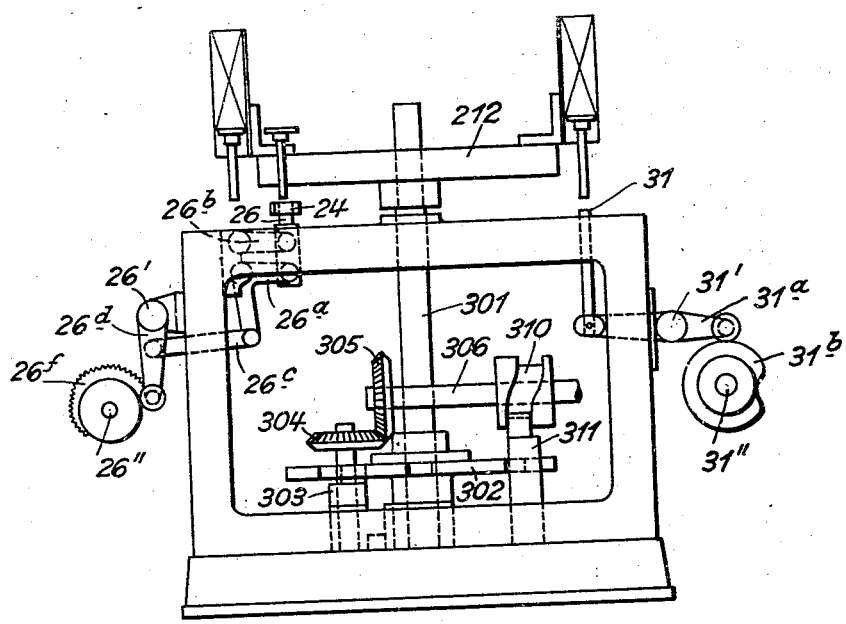
Figures 25 and 26 show in side elevation and in plan details of the conveyor mechanism for the bag filling and closing machine.
Figure 26:
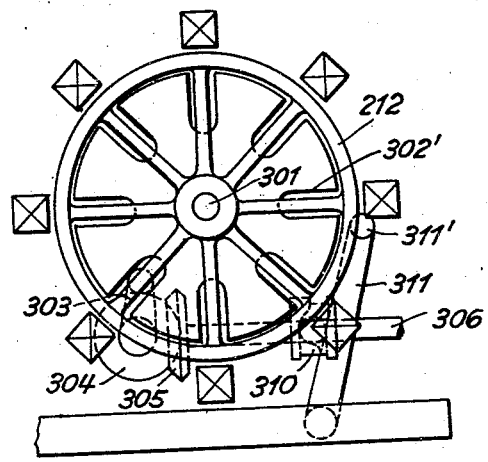

The conveyor wheel 212 is secured to a vertical shaft 301, Figures 25, 26, mounted in suitable bearings of the machine frame. To the under end of the shaft 301 is secured a Maltese wheel 302 of known construction to which a stepwise rotation is imparted by the rotating crank 303 in the well known manner. The rotation of the crank 303 is effected by means of the bevel gear 304 engaging with a bevel gear 305 on the shaft 306 which is rotated by a suitable drive of the machine. 311 designates a rocking lever operated by a drum-like eccentric 310 of the shaft 306 in such a manner that after each feed step of the wheel 212 the Maltese wheel 302 is fixed by a roller 311' of the lever 311 entering one of the slots 302' of the wheel 302.

The receptacles of the conveyor wheel 212 may in well known manner be designed as boxes or pockets. In the case illustrated, the receptacles 10 have in cross-section the shape of a U, open toward the outside, which as particularly clearly shown in Figs. 11 and 12, is formed by two angles 10$^b$ and 10$^c$ fixed at a backplate 10$^a$. The side walls formed by the angles 10$^b$, 10$^c$ possess at the upper ends horizontal outwardly projecting portions 10$^d$ and 10$^e$ of triangular shape. The boxes 10 are with their rear wall mounted at the upper angle of the wheel 212. Outside there extend around the boxes stationary hoops 11$^a$ and 11$^b$ connected by vertical webs. The bottom of each box is formed by a plate 12 which is capable in known manner of vertical displacement against a locking device and is guided by a rod 13 in a bracket 13$^a$ fixed to the lower angle of the conveyor wheel 212. In the case illustrated, an automatically clamping roller or ball lock is employed for the rod 13. The roller or ball is accommodated in a chamber or cavity 13$^b$ of the pedestal 13$^a$ in such a way that it abuts on the one hand against the rod 13 and on the other hand against an inclined plane 17 provided within the said chamber. The roller 15 is continually forced downwards by a spring 16 so that it is able to lock the rod 13 with certainty at any desired height. Through the bottom passes into the chamber 13$^b$ a bolt or pin 18 adapted to be pushed upwards for the purpose of lifting the ball 15. There are fixed in the rods 13 screws 19 which in the bottommost position of the plates 12 and rods 13 abut against the upper edge of guide slots 14 which are provided in the protective covering 20 mounted on the pedestal 13$^a$ and revolving with the conveyor wheel. The rod 13 is furthermore provided with a recess or notch 22 near its bottom end.

When the empty bag is introduced into the receptacle 10 at the station I, the bottom plate 12 is in its bottommost position. During the next forward step of the conveyor wheel 212, the bag is conveyed in its receptacle upon the station II, where the bag is filled. Prior to reaching the station II, the bolt 18 runs on to a stationary rail 21 which, as Fig. 3 shows, extends up to the front of the station V in the path described by the bolt 18. The rail 21 is mounted on an angle 216 fixed on the bed plate 215 of the machine and extends at such a height that prior to reaching the central position of station II and up to its end in front of the station V it will raise the bolt 18 and by this means also lift the roller 15 against the resistance of the spring 16 and thereby release the clamping action upon the rod 13 of the bottom plate. At the station II, another rail 24 has entered into engagement with the notch 22 of the rod 13. The said rail 24 is fixed by a lever 25 to the bolt 26. The bolt 26 is pivoted, Figure 25, to a crank lever 26$^a$ which is connected by the link 26$^c$ to a lever 26$^d$ which is pivotally mounted at 26' and is operated by the eccentric 26$^f$ fixed upon a shaft 26'' which is rotated by a suitable drive of the machine. Parallel to the arm 26$^a$ there is provided a link 26$^b$ in order to ensure an upright reciprocation of the rod 26.

At the station II, the bottom plate 12 released from its locking device is raised with the bag resting thereon up to the filling funnel 217 of the filling mechanism 218 by the rail 24. The filling apparatus may consist of any suitable measuring device of customary design, by which the desired contents of the bag is measured out and filled into the bag. The filling device 218 is mounted on the pillar 219. During the filling process, the rail 24 and thus also the bottom plate 12 and the bag have imparted to them by means of the said eccentric a shaking vertically reciprocating motion so that the contents is uniformly distributed in the bag. After the filling of the bag is finished, the rail 24 is again lowered, whereas due to the lifting of the bolt 18 and of the roller 15 the clamping device for the bottom plate is still held inoperative by the rail 21.

During the next forward motion of the conveyor wheel 212, the notch 22 of the rod 13 passes over a rail 27 which extends up to the station V and is adapted to shake the filled bags.

As shown in Figures 27 and 28, for producing the vertical reciprocating motion of the rail 27, vertical bolts 27$^a$ and 27$^b$ are fixed in eyes 27' and 27'' secured to the said rail 27. The bolts 27$^a$ and 27$^b$ are adjustably guided in sleeves 27$^c$ and 27$^f$. At the under end of sleeve 27$^c$ there is provided an extension or lug 27$^g$ and at the under end of sleeve 27$^f$ there is provided an eye, a rod 27$^h$ being passed through said extension and said eye. On the rod 27$^h$, there are mounted two blocks 27$^x$ of a crank lever 27$^m$ pivoted by a bolt in the bearing 27$^n$ and operated by the eccentric 27$^o$ secured to a shaft 27$^y$ which is rotated by a suitable drive of the machine. In order to avoid a tilting of the bolts 27$^a$ and 27$^b$, there are provided for each sleeve 27$^c$ and 27$^f$ pairs of parallel links 27$^p$ and 27$^s$ which ensure a correct vertical movement of the rods 27$^a$ and 27$^b$ and of the rail 27. In this way, the rail 27 will impart to the filled bag an intensive shaking motion by the aid of the rod 13 above the stations III and IV up to the working station V so that the material filled into the bag can settle down in adequate density.

Shortly before the bag reaches the station V during the next feeding step of the wheel 212, the bolt 18 is released by the rail 21 and the notch or recess 22 is released by the rail 27 so that at the station v the roller 15 will again exert its automatic clamping action upon the rod 13.

At the station V, there is effected the adjustment of the bag at the correct height required for the sealing of the bag by alignment of the surface of the bag contents at the level or height of the sealing edge. For this purpose, there is at the station V below the rod 13, according to Figs. 5 and 25, provided a lifting rod 31 which in its inoperative position takes up such a low position that the rod 13 always passes freely above the rod 31 when the receptacle has been passed forward on to the station V. The lifting rod 31 is operated by a double-armed lever 31$^a$ which is pivoted at 31' and controlled by an eccentric 31$^b$ of a shaft 31'' which is rotated by a suitable drive of the machine. The stamp 32 is with its rod 32$^a$ yieldingly guided in a sleeve 32$^b$, see Figure 27, which is connected by a clamping member 32$^c$ with the guide rod 32$^d$. The under end of the rod 32$^d$ which is guided for vertical reciprocation in suitable bearings of the bracket 32$^f$, engages a rocking lever 32$^g$ to which a rocking motion is imparted by means of the rod 32$^h$ and the eccentric 32$^k$ fixed on the shaft 32$^x$ which is rotated by a suitable drive of the machine. By means of the support 32$^z$ there is mounted on the clamping member 32$^c$ a double-armed lever 32$^m$ pivoted at 32$^u$. During the downward motion of the rod 32$^d$, the stamp 32 is lowered into the bag, and at the end of this downward movement the right-hand end of the lever 32$^m$ engages a fixed rod 32$^n$ by which, during the further downward motion, the stamp 32 is lowered into the bag against the action of the spring 32$^v$. After the bag has reached the station V, the stamp is lowered from its upper position (Figure 27) into the lower position within the bag shown in Fig. 5. This lower position of the plunger 32 corresponds always accurately with the height or level of the correct closing edge for the production of the head seal of the bag. The rod 31 is now raised, and thus also the rod 13, bottom plate 12 and bag P, until the surface of the contents of the bag encounters the stamp 32 situated at the desired sealing level and a further raising of the bag P is prevented thereby. The upward motion of the rod 13 by the rod 31 can take place easily, since the roller 15 rolls on the rod 13 and the inclined plane 17 and is capable of deviating upwards against the spring 16. As soon, however, as the upward motion of the rod 13 has been arrested and the rod 13 will be returned into its bottom position, the roller 15 will be forced downwards by the spring 16 so that it will take up immediately its clamping position again and thus prevents the rod 13 from descending. In this way, the bag is maintained in the accurately aligned position as regards height for the correct production of the upper head seal or closure. The drive of the rod 31 is designed in the well known and customary manner such that the upward motion of the rod 31 takes place under the action of a spring, so that the upward motion of the rod 31 ceases as soon as the bag P is prevented from a further upward motion by the plate 32.

At the station V, a ticket, credit slip or the like may be introduced into the bag and placed on the material contained therein, by suitable mechanism well known in the art.

The bottom plate 12 and the bag P maintain the height adjusted at the station V up to the ejection of the bag from the machine which takes place at the station VIII and will be described hereafter.

After the next feed of the bag by the conveyor wheel upon the station VI, the folding of the head flaps of the bag takes place here by the mechanism illustrated in the Figs. 8–10 and in the successive stages diagrammatically shown in Figs. 16–18. At the station VI, a pedestal 50 is mounted on the bed plate at the outside of the conveyor wheel and carries at one side the bearing arm 51. In the eyes 50$^a$ and 51$^a$ is adapted to rotate a bolt 53 upon which are fixed the levers 54 and 55. A rocking motion can be imparted to this bolt by means of the lever arm 300$^x$ and the rod 301 from a suitable eccentric drive of the well known and customary construction. At the upper ends of the levers 54 and 55 there is pivoted in the eyes 54$^a$ and 55$^a$ by means of a bolt 220 a slide 56 at the underside of which there is fixed a cam-like rail 57 with a stepped slide face. The cam rail 57 rests with its slide face upon a roller 59 mounted in stationary bearings of a bracket and against which the slide 56 with the rail 57 is constantly drawn by springs 60. Upon the slide 56 is fixed a plate 61 which is broadened at its front end 61$^a$ and adapted to serve as a folding plate. In the lateral eyes 61$^b$ and 61$^c$ which are mounted on the plate 61 by means of flanges 61$^d$ and 61$^e$, there are fastened bolts or pins 63 and 63$^a$. Upon these pins there are by means of the eyes 62$^b$, 62$^c$ and 62$^d$ and 62$^e$ pivoted the folding plates 62$^a$ and 62 which at their front ends are pointed under an acute angle. Torsion springs 64 and 64$^a$, which are wound around the free ends of the pins 63 and 63$^a$, are at one end fixed to the bearing eyes 62$^e$ and 62$^c$, respectively, and at the other end to the heads 63$^c$ and 63$^b$, respectively, so that they have the tendency to keep the folding plates 62 and 62$^a$ in their vertical raised position shown in Figs. 8 and 9. On pins 62$^f$ and 62$^g$ which are fixed in eyes of the arms 65, 65$^b$ and 65$^a$, 65$^c$, are pivoted rollers 66 and 66$^a$. Above the rollers 66 and 66$^a$ there are fixed upon a rod 68 angle pieces 67 and 67$^a$ by means of the T-shaped cross-piece 67$^b$. The rod 68 carries at its lower end a press plate 69 and is secured to an arm 68$^a$. The arm 68$^a$ is fixed on a guide rod 68$^b$, Figures 30 and 31, which is slidably guided in an eye 68$^c$ of the bracket 80$^g$ and in the machine frame. At the under end of the rod 68$^b$ is secured a block 68$^d$ with a lateral horizontal slot which is engaged by the bolt 68' of a rocking lever 68ᶠ pivoted at 68'' on the bracket 68ᵍ. The rocking lever 68ᶠ is operated by a rod 68ʰ and an eccentric 68ⁱ of the driving shaft 204.

In the pedestals 50 and 51, there is journaled a shaft 70 adapted to be oscillated or rocked by an arm 302 and a rod 303 and upon which at both sides of the pedestal 50 levers 71, 71ª are fixed which engage the slots 73, 73ª of bows 74, 74ª by means of the link blocks 72 and 72ª, respectively. Parallelogram-like with the levers 71, 71ª the levers 76, 76ª by means of pin 77 pivoted in the pedestal 50, are by means of pins 78, 78ª pivotally connected with the bows 74, 74ª. The bows 74, 74ª carry by means of bolt 74ᵇ a folding roller 75. At their front ends, the two bows 74, 74ª are rigidly joined by a spacing bolt 74ᶜ. A vertical reciprocating motion can be imparted to the rod 303 by a suitable eccentric drive of well known construction.

The operation is as follows:

When the bag has arrived at the station VI, the slide 56 with the folding plate 61ª and the swinging folders 62, 62ª in their vertical position is by means of the operating mechanism described moved from its rear position (not shown) into its front position illustrated in Figs. 8 and 10.

In the rear position of the pedestal 56, the cam piece 57 rests with its front surface 58ª on the roller 59, so that the folding plate 61ª is held swung upwards by the difference in height of the two guide faces 58ª and 58ᵇ in relation to the position indicated in Fig. 8, around the bolt 220. If the slide 56 is now pushed forward, the front edge of the folding plate 61ª will move at first in the same upper elevation, until the guide face 58ª passes into the inclined surface 58. During the progress of the inclined surface 58 on the roller 59, a lowering of the folding plate 61ª then takes place which, when the guide surface 58ᵇ comes in contact with the roller 59, is moved, in its horizontal position according to Fig. 8, finally into its front working position. In consequence of the folding plate 61ª being, in the manner described, moved at first against the bag P at a height which lies above the folding edge and then is moving downwards during its further advance, the first flap 1' is folded according to Fig. 17 down with certainty over the material in the bag or the cardboard ticket or the like placed eventually upon the contents of the bag at the station V. As soon as the flap 1' has been folded down, the lateral folding plates 62, 62ª are by means of the rollers 66, 66ª swung outwards into the horizontal position shown in Fig. 10 in full lines and in Fig. 9 in dotted lines, by the angles or pressure pieces 67, 67ª being moved downwards by the rod 68. In this way, the lateral flaps 1² are according to Fig. 18 flattened down outwardly in the form of corners or points 1³ and 1⁴, which are pressed down upon the laterally projecting triangular extension plates 10ᵈ and 10ᵉ of the receptacle, in order to obtain a satisfactory creasing.

After the folding has been completed, the folding members 61ª, 62 and 62ª are moved back into their starting or initial position by the return motion of the slide 56, while simultaneously the bows 74, 74ª with the roller 75 are moved by the described operating mechanism across the folded down parts of the bag into the position designated in Fig. 8 by (75ª) and back again, in order to roll smooth the folded parts by means of the roller 75. As soon as the roller 75 has been moved back into its outer position, the rod 68 is again lowered in order to press the plunger 69 upon the folding and thus to effect a repressing of the folded parts.

When by the next forward step of the conveyor wheel 212 the bag reaches the station VII, adhesive will be applied to the corners 1³ and 1⁴ of the bag. The apparatus employed for this purpose consists in the well known manner of two triangular applying plates 80 which are by means of bolts 80ª and springs 80ᵇ resiliently suspended from a supporting plate 80ᶜ. The plate 80ᶜ is mounted on a slide 80ᵈ guided upon the rail 80ᵉ and is adapted to be reciprocated by a connecting rod 80ᶠ and a crank lever 80ⁱ pivoted at 80' in the bracket 80ᵍ. The lever 80ⁱ is operated by the rod 80ᵐ and the eccentric 80ᵒ secured to the shaft 204, Figures 30 and 31. The rod 152 bearing by means of the arm 80ʰ the rail 80ᵉ is slidably guided in a sleeve of the bracket 80ᵍ and operated by a double-armed lever 80ᵖ which is pivoted on the bolt 80' and operated by the rod 80ᑫ and the eccentric 80ˢ secured to the shaft 204. The rail 80ᵉ is by an arm 80ʰ fastened to a rod 152 to which a vertical reciprocating motion can be imparted by a suitable well known eccentric drive and which in its turn transmits this motion to the rail 80ᵉ.

For applying the adhesive to the flaps 1³ and 1⁴, the slide 80ᵈ is moved from its inoperative position outside the reach of the conveyor wheel, upon the rail 80ᵉ which is in its raised position, until it stands above the bag, and the rail 80ᵉ with the slide 80ᵈ is then lowered so far that the plates 80 provided with adhesive are resiliently pressed upon the flaps 1³ and 1⁴ which in their turn rest upon the lateral triangular extensions 10ᵉ and 10ᵈ of the receptacle for the bag. When the rail 80ᵉ ascends again, the flaps 1³, 1⁴ at first adhere to the plates 80 so that they are lifted off the plates 10ᵈ and 10ᵉ and slightly raised. The slide 80ᵈ is then again returned into its outer or rest position, the plates 80 passing in the well known manner over a suitable gum or adhesive applying roller of the customary construction which applies adhesive to the bottom faces of the plates 80.

To ensure that the turning over of the two flaps 1³, 1⁴ now taking place is effected exactly along their folding edges, special creasing or embossed marking may be applied to the said folding edges indicated at f, f prior to the application of the adhesive. For this purpose, a press plate 90 is provided which is furnished with sharp folding edges or knives 91 and 92. The plate 90 is by means of the threaded screw pins 90ᵇ fixed upon a bolt 90ᵃ which is journaled in a sleeve 90ᶜ. This sleeve is mounted at the stationary supporting rod 90ᵈ. Upon the end of the bolt 90ᵃ projecting from the sleeve 90ᶜ there is fixed an arm 90ᶠ adapted to be vertically oscillated by a suitable and well known eccentric drive.

When the bag arrives at the station VII, the plate 90 is in its swung up position indicated in Fig. 13 at (90) in dashes and dots. Before the slide 80ᵈ attains its front working position, the plate 90 is already swung downwards into its horizontal position by its operating mechanism, the knife edges 91, 92 of the plate 90 entering the folding edges f, f and producing hereby a sharp crease.

The turning over of the flap 1³ lying in the rear viewed in the direction of feed, takes place by means of a folding plate 81 attached to a lever 81ᵃ. The lever 81ᵃ is adapted to rock upon the shaft 301 of the conveyor wheel in such a manner that in carrying out its oscillations the folding plate 81 reaches the working position shown in Fig. 14 and again returns into the inoperative position of Fig. 11, whereby the plate 81 folds the flap 1³ down upon the upper front face of the bag, according to Fig. 14. As particularly clearly shown in Fig. 14, the forward swing motion of the folding plate 81 takes place, while the bag is already being moved forward from the station VII to the station VIII, and the operating mechanism for the rocking lever 81ᵃ is designed in such a manner that the folding plate 81 has a slight lead in relation to the feed motion of the conveyor wheel, in order to complete the folding over of the flap 1³ situated in the rear viewed in the direction of feed, by means of the folding plate 81, before the last flap 1⁴, in the direction of feed situated in front, will be turned over. As shown in Figures 32 and 33, the arm 81ᵃ is rigidly connected to the lever arm 81ᶠ. The desired horizontal rocking movement is imparted to the arms 81ᶠ and 81ᵃ and to the folding plate 81 by the connecting link 81ᵍ, the crank lever 81ᵏ pivoted at 81 in the bracket 81ʰ, the rod 81ˡ and the eccentric 81ᵐ secured to the driving shaft 204.

The socket 90ᵈ for the creasing plate 90 is secured to the bracket 81ʰ, and the rocking movement is imparted to the arm 90ᶠ by a rod 90ᵍ and an eccentric 90ⁱ secured to the driving shaft 204.

Since the folding plate 81 moves during the feed motion of the conveyor wheel from the position of the Fig. 11 into that of Fig. 14, a special holding down device 240 is provided between the stations VI and VII, which prevents the side flaps 1³, 1⁴ from rising during the travel of the bag from the station VI to the station VII. This holding down device consists in the case illustrated of a rail 240 which projects into a recess 81ᶜ of the folding plate 81 and is secured to the hoops 11ᵃ, 11ᵇ.

The turning over of the last flap or point 1⁴ takes place by a folding plate 85 which by means of a hinge 84 is pivotally mounted on a plate 86 and with a set screw 85ᵃ rests upon the upper hoop 11ᵃ. On the folding plate 85 there is by means of the rail 85ᵇ, in which is also mounted the set screw 85ᵃ, journaled a roller 83. On the rocking lever 81ᵃ is mounted a rail 82 which according to Fig. 15 is at its front end 82ᵃ designed as a descending curve. During the described forward motion of the folding plate 81, the rail 82 is likewise moved forward by the rocking lever 81ᵃ into the position shown in Figs. 14 and 15, and thereby the roller 83 and thus also the folding plate 85 is raised by the cam edge 82ᵃ. Since the folding plate 85, as shown in Fig. 12, extends until beneath the point or corner 1⁴, this point will likewise be raised at a right angle by the raising of the folding plate 85, so that when the bag is pushed forward under the plate 85 and the plate 86 on to the station VIII, the closing flap 1⁴ will be folded down on and cemented to the flap 1³ previously folded down by the folding plate 81, so that the bag is now finally closed.

In order to exert an elastic pressure by the plate or rail 86 upon the seal of the bag, the rail 86 is held down by spring pressure. For this purpose, the rail is secured to the flat head 86ᵃ of a bolt 86ᵇ which is adapted to slide vertically in a sleeve 86ᵉ fixed upon the rod 86ᵈ by means of an arm 86ᶜ. Between the sleeve 86ᵉ and the head 86ᵃ is interposed a spring 86ᶠ by which the rail 86 is resiliently forced into its lowest position determined by the collar 86ᵍ mounted upon the bolt 86ᵇ. The bolt 86ᵇ is prevented from turning within the sleeve 86ᵉ and thus to turn the press rail 86 by pins 86ʰ, which are screwed into the bolt 86ᵇ and engage vertical internal grooves 86ⁱ of the sleeve 86ᵉ. For introducing the bolt into the sleeve 86ᵉ and the pins 86ʰ into the grooves 86ⁱ, the grooves 86ⁱ continue arc-like in a vertical continuous inner groove 86ᵏ of the sleeve 86ᵉ.

At the station VIII, a label may be affixed to the upper head seal by any suitable mechanism of known construction.

After the labelling of the bag at the station VIII, it is necessary to align the bottom of the bag with the discharge plane of the discharging mechanism 251, Fig. 1. This is attained in such a way that according to Figs. 6 and 7, a rod 35 passes underneath the bolt 18, lifts it up and thus releases the rod 13 from the clamping action of the roller 15, so that the bottom plate 12 with the sealed bag also reaches the lower position limited by the screws 19. This position corresponds with the discharge plane of the discharge mechanism 251 into which the finished bags are now introduced by means of any well known and therefore not illustrated ejecting mechanism across an intermediate bridge-like support, equally well known and arranged between the station VIII and the discharge mechanism. As shown in Figures 29 and 29$^a$, the operating mechanism of the lifting rod 35 consists of a lever 35$^b$ pivoted at 35$^d$ and operated by an eccentric 35$^c$ fixed on a shaft 35$^e$ which is rotated by a suitable drive of the machine. The operating lever 35$^b$ is connected by the link 35$^a$ to a block 35$^f$ fixed to the under end of the rod 35 which is guided for vertical reciprocation in the sleeve 35$^g$ of a bracket 35$^h$. The discharge or ejecting mechanism 251 may in the known manner consist of two endless belts which at the height of the bags are arranged above one another and by means of pulleys are so driven that the parts of the endless belts facing each other move in the same direction outwards, so that the bags are during the discharge motion in the also known manner kept under pressure for a certain time by the two belts and thus leave the machine with their sealed ends in a perfectly dry state.

After the finished bag has at the station VIII been conveyed into the discharge mechanism 251 in the direction of the arrow of Fig. 1, the bottom plate 12 of the conveying receptacle is during the further forward motion of the conveyor wheel positively aligned towards the bottom in the event that the plate should not yet have taken up accurately its bottommost position. For this purpose, there are at the station VIII, Figs. 3, 6 and 7, provided two rails 40 and 41 secured side by side to supporting rails 40$^a$ and 41$^a$ which in their turn are secured to a stationary common holding piece 253. At the station VIII, the rail 41 has with its wedge-shaped front end already engaged the recess 22. While during the feed motion of the conveyor wheel from the station VIII to station I, the bolt 18 runs on the ascending inclined upper edge of the rail 40 and is forced upwards by the upper horizontal edge of this rail and the roller 15 is thus prevented from exerting a clamping action, the notch 22 moves over the wedge-shaped rail 41, so that, if after the release of the clamping device the bottom plate 12 should not have dropped automatically or not completely into the lowest position, this is now effected, because by the engagement of the wedge face of the rail 41 with the bottom edge of the recess 22 the rod 13 and thus the bottom plate 12 are pulled down into the lowest position.

Various changes and modifications may be made in the details of the invention without departing from its spirit, and I desire, therefore, that only such limitations shall be placed thereon as are imposed by the prior art.

What I claim, is:

1. In a packing machine of the type specified, comprising a bag filling and closing machine having an intermittently operated conveyor mechanism with a plurality of receptacles having displaceable bottom plates for conveying the bags step by step to the various working stations, means for holding the bottom plates of the receptacles of the conveyor mechanism for vertical displacement and comprising guide rods secured to the bottom plates and automatically acting locking devices cooperating with said guide rods, means for releasing the locking devices comprising bolt-like members arranged to release the self-locking action of said devices, and means adapted to lift up at the desired places of the feed path of the conveyor receptacles said bolt-like members.

2. In a packing machine of the type specified, comprising a bag filling and closing machine having an intermittently operated conveyor mechanism with a plurality of receptacles having displaceable bottom plates with guide rods for conveying the bags step by step to the various working stations, automatically acting means for locking and for releasing said bottom plates, and means for jolting the bottom plates of the said receptacles and comprising a rail arranged along the length of the desired jolting path and adapted to engage notch-like recesses in the guide rods of said bottom plates, and means to subject said rail to a jolting vertical reciprocating motion.

3. In a packing machine of the type specified, comprising a bag filling and closing machine having an intermittently operated conveyor mechanism with a plurality of receptacles having displaceable bottom plates with guide rods for conveying the bags step by step to the various working stations, automatically acting means for locking and for releasing said bottom plates, and means for jolting the bottom plates of the said receptacles and comprising a rail arranged along the length of the desired jolting path and adapted to engage notch-like recesses in the guide rods of said bottom plates, means to subject said rail to a jolting vertical reciprocating motion, a separate rail section being provided at the filling station adapted to engage the said notch-like recesses in the guide rods and to jolt the bottom plates of the receptacles and also adapted to raise the bottom plates up to the hopper of the filling device.

4. In a packing machine of the type specified, comprising a bag filling and closing machine having an intermittently operated conveyor with a plurality of receptacles having displaceable bottom plates with guide rods for conveying the bags step by step to the various working stations, automatically acting means for locking and for releasing said bottom plates, and means for lowering the bottom plates of the said receptacles into their bottom position prior to the introduction of a new bag into the conveyor mechanism and comprising a stationary rail having a wedge-shaped forward end arranged and adapted to engage notch-like recesses in the guide rods of said bottom plates prior to the introducing station during the forward motion of the conveyor mechanism and to pull the rods down.

5. In a packing machine of the type specified, a closing mechanism comprising a folding plate adapted to fold inwards the outward head flap of the bag, two lateral folding plates adapted to fold outwardly the adjoining side flaps, a horizontal folding plate adapted to raise and fold down inwardly the side flap situated at the rear viewed in the direction of feed, and means to swing said folding plate in the horizontal plane during the advance of the bag forward in the direction of the feed but at a higher in the direction of the speed of the bag.

6. In a packing machine of the type specified, having an intermittently operated conveyor mechanism for feeding the bags, a closing mechanism comprising a folding plate adapted to fold inwards the outward head flap of the bag, two lateral folding plates adapted to fold outwardly the adjoining side flaps, a horizontal folding plate adapted to raise and fold down inwardly the side flap situated at the rear viewed in the direction of feed, means to swing said folding plate in the horizontal plane during the advance of the bag forward in the direction of the feed but at a higher speed than the speed of the bag, and a stationary horizontal holding down member arranged to enter a recess at the back end of this folding plate and to keep down the horizontally folded down flaps of the bag during the feed motion of the conveyor mechanism.

7. In a packing machine of the type specified, having an intermittently operated conveyor mechanism for feeding the bags, a closing mechanism comprising a folding plate adapted to fold inwards the outward head flap of the bag, two lateral folding plates adapted to fold outwardly the adjoining side flaps, a swinging folding plate adapted to raise and fold inwardly the side flap situated at the rear viewed in the direction of feed, and a folding plate for raising and folding down inwardly the side flap situated in front in the direction of feed, said folding plate being hinged to the front end of a press plate arranged in the path of the said folding plate, and means for turning upwards by a certain amount the folding plate during the advance of the bag.

8. In a packing machine of the type specified, having an intermittently operated conveyor mechanism for feeding the bags, a closing mechanism comprising a folding plate adapted to fold inwards the outward plate adapted to fold inwards the outward head flap of the bag, two lateral folding plates adapted to fold outwardly the adjoining side flaps, a folding plate for raising and folding inwards the side flaps situated at the rear viewed in the direction of feed, means to swing this folding plate in the horizontal plane during the advance of the bag forward in the feed direction but at a higher speed than the speed of the bag, a folding plate for raising and folding down the flap situated in front in the direction of feed, said folding plate being hinged to the front end of a press-plate arranged in the path of the bags, and means for turning upwards by a certain amount the folder-plate during the advance of the bag, this means consisting of a cam-like member secured to and moved forward together with the said horizontal swinging folding plate for folding down the flap situated at the rear and thereby raising a roller mounted on the hinged folding plate.

9. In a packing machine of the type specified, a closing mechanism comprising an intermittently operated conveyor mechanism for feeding the bags, a folding plate adapted to fold inwards the outward head flap of the bag, two lateral folding plates adapted to fold outwardly the adjoining side flaps, a folding plate adapted to raise and fold inwards the rear side flaps, and a folding plate adapted to raise and fold inwards the front side flap seen in the feed direction, means for creasing prior to the folding down of the said two side flaps the upper surface of the bag in the direction of the folding edges to be made, said creasing means consisting of a plate having creasing knives and adapted to be lowered and raised in relation to the said upper surface of the bag.

10. A packing machine of the type specified, having means for closing the filled bag comprising a central folding plate for folding inwards the outward head flap of the bag and adapted to perform a tilting movement during its folding stroke, and two lateral folding plates adapted to be turned outwardly for folding horizontally outwards the adjoining side flaps, said two lateral folding plates being pivotally mounted on either side on said central tilting folder plate by means of hinges provided with lateral outwardly extending abutments bearing rollers, and press members being arranged above said rollers for a vertical reciprocation and adapted to move in their downward movement the said rollers down for turning outwardly the said lateral folders.

11. A packing machine of the type specified, having means for closing the filled bag comprising a central folding plate for folding inwards the outward head flap of the bag and adapted to perform a tilting movement during its folding stroke, and two lateral folding plates adapted to be turned outwardly for folding horizontally outwards the adjoining side flaps, said two lateral folding plates being pivotally mounted on either side on said central tilting folder plate by means of hinges provided with lateral outwardly extending abutments bearing rollers, and press members being arranged above said rollers for a vertical reciprocation and adapted to move in their downwards movement the said rollers down for turning outwardly the said lateral folders, the means for vertically reciprocating said press members comprising a vertically displaceable rod carrying a plunger for re-pressing the folded down parts.

12. In a packing machine comprising a conveyor mechanism with a plurality of receptacles having displaceable bottom plates for conveying the bags successively to the various working stations, means for holding the bottom plates of the said receptacles for vertical displacement comprising guide rods secured to the bottom plates and guided within chamber-like parts of the conveyor mechanism and self-acting locking devices cooperating with said guide rods and comprising for each guide rod a ball-like clamping member within said chamber and means for moving the clamping member into and maintaining it in automatic clamping engagement between the guide rod and a counter surface of the chamber, means for releasing the self-acting devices and adapted to move said clamping member out of clamping engagement against the action of said means for moving the clamping member into engagement, and means adapted to operate at the desired places of the feed path of the conveyor receptacles said releasing means.

13. In a packing machine comprising a conveyor mechanism with a plurality of receptacles having displaceable bottom plates for conveying the bags successively to the various stations, means for holding the bottom plates of the said receptacles for vertical displacement comprising guide rods secured to the bottom plates and guided within chamber-like parts of the conveyor mechanism and self-acting locking devices cooperating with said guide rods and comprising for each guide rod a ball-like clamping member arranged within said chamber-like part, a spring provided within the chamber and adapted to force said clamping member into clamping engagement with the guide rod and with a wall of the chamber inclined toward the guide rod in the direction of the clamping action, and a pushrod guided in and projecting outwards from the chamber-like part and adapted to act on the side of the ball-like clamping member opposite to said spring for lifting the ball-like member off its seat, and means adapted to lift up at the desired places of the feed path of the conveyor receptacles said pushrods.

In testimony whereof I have affixed my signature.

PAUL GANGLER.